(12) United States Patent
Jang et al.

(10) Patent No.: US 8,692,969 B2
(45) Date of Patent: Apr. 8, 2014

(54) COLOR FILTER AND DISPLAY DEVICE EMPLOYING THE SAME

(75) Inventors: Jae-eun Jang, Seoul (KR); Gae-hwang Lee, Hwaseong-si (KR); Kyu-young Hwang, Seoul (KR); Jae-eun Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 182 days.

(21) Appl. No.: 12/923,882

(22) Filed: Oct. 13, 2010

(65) Prior Publication Data

US 2011/0261294 A1 Oct. 27, 2011

(30) Foreign Application Priority Data

Apr. 23, 2010 (KR) ........................ 10-2010-0038104

(51) Int. Cl.
*C09K 19/02* (2006.01)
*G02F 1/1333* (2006.01)

(52) U.S. Cl.
USPC ................. 349/163; 349/86; 349/88; 349/89

(58) Field of Classification Search
USPC ....................................... 349/86, 88–89, 183
See application file for complete search history.

(56) References Cited

U.S. PATENT DOCUMENTS 5,508,831 A * 4/1996 Nakamura et al. .............. 349/86
5,986,729 A * 11/1999 Yamanaka et al. .............. 349/79
6,266,037 B1 * 7/2001 Flasck ............................. 345/92
6,690,443 B1 * 2/2004 Poliakine ....................... 349/152
2003/0184692 A1 * 10/2003 Nagae ............................. 349/86
2004/0233369 A1 * 11/2004 Yamagishi et al. ........... 349/139
2005/0218377 A1 * 10/2005 Lawandy ................. 252/299.01
2006/0119917 A1 * 6/2006 Sutherland et al. ............. 359/34
2007/0291335 A1 * 12/2007 Lee et al. ...................... 358/512
2008/0192109 A1 8/2008 Valenzuela et al.
2010/0060825 A1 * 3/2010 Jang et al. ........................ 349/86
2010/0118065 A1 * 5/2010 Song et al. .................... 345/697
2010/0208172 A1 * 8/2010 Jang et al. ........................ 349/71

FOREIGN PATENT DOCUMENTS

| JP | 02-216130 A | * | 8/1990 |
| JP | 07-154763 | * | 6/1995 |
| JP | 09-304316 | * | 6/1995 |
| JP | 09-304316 | | 11/1997 |
| JP | 200-356957 | * | 12/2000 |
| JP | 2000-356957 | | 12/2000 |
| JP | 2002-265946 | | 9/2002 |
| JP | 2003-066214 | * | 3/2003 |
| KR | 10-2001-00344 85 | * | 4/2001 |
| KR | 10-2001-0034485 | | 4/2001 |
| KR | 10-2001-00622 64 | * | 7/2001 |
| KR | 10-2001-0062264 | | 12/2001 |

* cited by examiner

*Primary Examiner* — Lauren Nguyen
*Assistant Examiner* — Anthony G Quash
(74) *Attorney, Agent, or Firm* — Harness, Dickey & Pierce, P.L.C.

(57) ABSTRACT

The color filter may include a pixel unit having a plurality of sub-pixels of different colors, wherein the plurality of sub-pixels respectively include flat plate metal layers and a plurality of color PDLC layers on the flat plate metal layers, and the plurality of color PDLC layers each include a polymer, a plurality of liquid crystal drops dispersed in the polymer, and a plurality of color display materials mixed in the liquid crystal drops.

9 Claims, 4 Drawing Sheets

COLOR FILTER AND DISPLAY DEVICE EMPLOYING THE SAME

CROSS-REFERENCE TO RELATED APPLICATIONS

This application claims priority under U.S.C. §119 to Korean Patent Application No. 10-2010-0038104, filed on Apr. 23, 2010, in the Korean Intellectual Property Office (KIPO), the entire contents of which are incorporated herein by reference.

BACKGROUND

1. Field

Example embodiments relate to a color filter and a display device employing the same.

2. Description of the Related Art

Recently, as portable display devices, for example, a mobile phone, a personal digital assistant (PDA), a portable multimedia player (PMP), or a digital multimedia broadcasting (DMB) device, have widely spread, the need for display devices with lower power consumption and higher visibility has increased.

Among the display devices, reflective display devices have attracted much attention. Reflective display devices may form an image by using an external light source, e.g., solar light or an external illumination light, instead of using a backlight installed in the reflective display devices. In general, reflective display devices include a reflective plate that reflects an incident external light. The reflective plate is required to have a scattering function and a reflection function by which light is uniformly reflected at various angles. In order to realize an ideal scattering and reflection, a reflective plate of various designs, for example, a reflection plate having a flexion pattern, has been proposed.

SUMMARY

A reflective plate and a display device employing the same are provided. Additional aspects will be set forth in part in the description which follows and, in part, will be apparent from the description, or may be learned by practice of example embodiments.

According to example embodiments, a color filter may include a pixel unit including a plurality of sub-pixels of different colors, the plurality of sub-pixels each including flat plate metal layers and a plurality of color PDLC layers on the flat plate metal layers, wherein the plurality of color PDLC layers each include a polymer, a plurality of liquid crystal drops dispersed in the polymer, and a plurality of color display materials mixed in the liquid crystal drops.

The plurality of sub-pixels may display red, green, and blue colors or yellow, magenta, and cyan colors. The plurality of color display materials may include a dichroic dye, a quantum dot, or a fluorescent dye. The color filter may further include a plurality of holes in each of the plurality of color PDLC layers, the plurality of holes exposing the flat plate metal layers. The proportion of a sum of cross-sectional areas of the plurality of holes in the plurality of color PDLC layers with respect to a sum of cross-sectional areas of the plurality of color PDLC layers may be in the range of about 10 to about 50%.

The plurality of color PDLC layers may each further include conductive nano structures. The conductive nano structures may include any one selected from the group consisting of carbon nanotube, ZnO nanowire, $TiO_2$ nanowire, SnO nanowire, and metal nanowire.

According to example embodiments, a display device may include a first substrate; a color filter on the first substrate, the color filter including a pixel unit having a plurality of sub-pixels of different colors, the plurality of sub-pixels each including flat plate metal layers and a plurality of color PDLC layers on the flat plate metal layers, and the plurality of color PDLC layers each include a polymer, a plurality of liquid crystal drops dispersed in the polymer, and a plurality of color display materials mixed in the liquid crystal drops; an optical shutter layer on the color filter and in which transmittance of incident light is individually controlled in a region corresponding to each of the sub-pixels; a transparent electrode on the optical shutter layer; and a second substrate on the transparent electrode.

The optical shutter layer may include a polymer dispersed liquid crystal mixed with black dyes. The flat plate metal layers included in each of the plurality of sub-pixels may be used as a pixel electrode for forming an electric field in a region of the optical shutter layer corresponding to each of the plurality of sub-pixels. The electric field may be formed by applying a voltage between the transparent electrode and the flat plate metal layers.

The display device may further include a thin film transistor (TFT) array layer between the first substrate and the color filter, the TFT array layer including a plurality of TFTs for driving a pixel electrode of each of the plurality of sub-pixels.

The plurality of sub-pixels may display red, green, and blue colors or yellow, magenta, and cyan colors. The plurality of color display materials may include a dichroic dye, a quantum dot, or a fluorescent dye. The color filter may further include a plurality of holes in each of the plurality of color PDLC layers, the plurality of holes exposing the flat plate metal layers. The proportion of a sum of cross-sectional areas of the plurality of holes in the plurality of color PDLC layers with respect to a sum of cross-sectional areas of the plurality of color PDLC layers may be in the range of about 10 to about 50%.

The plurality of color PDLC layers may each further include conductive nano structures. The conductive nano structures may include any one selected from the group consisting of carbon nanotube, ZnO nanowire, $TiO_2$ nanowire, SnO nanowire, and metal nanowire.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
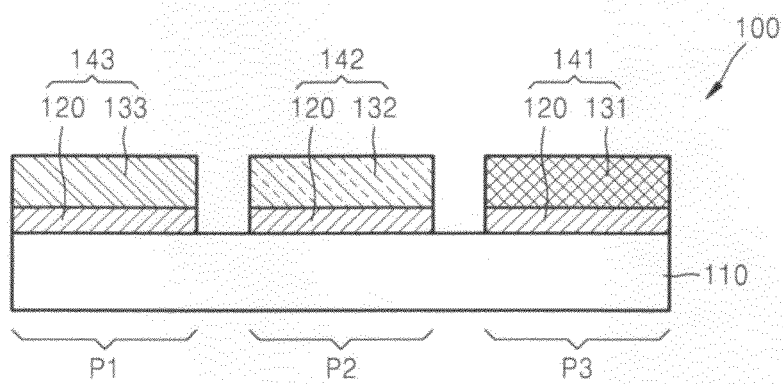
FIG. 1 is a schematic cross-sectional view illustrating a color filter according to example embodiments.

Hereinafter, example embodiments will be described in detail by explaining example embodiments with reference to the attached drawings. The same reference numerals in the drawings denote the same element. In the drawings, the thicknesses of layers and regions are exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
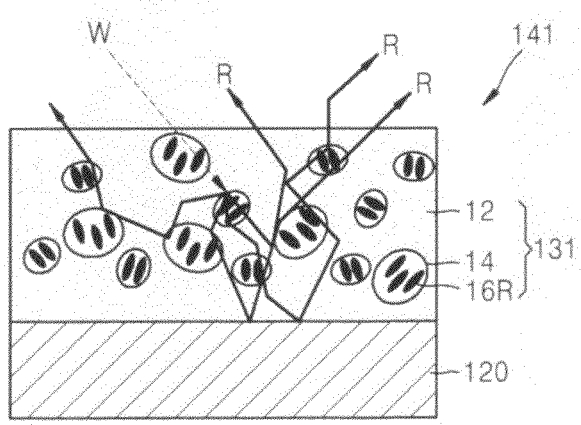
FIG. 2 is a cross-sectional view illustrating a scattering color structure of the color filter of FIG. 1, according to example embodiments.

FIG. 1 is a schematic cross-sectional view illustrating a color filter 100 according to example embodiments. FIG. 2 is a cross-sectional view illustrating a first scattering color structure 141 of the color filter 100 of FIG. 1, according to example embodiments.

Referring to FIGS. 1 and 2, the color filter 100 may include a pixel unit having a plurality of sub-pixels P1, P2, and P3 of different colors. The plurality of sub-pixels P1, P2, and P3 may respectively include a third scattering color structure 143, a second scattering color structure 142, and the first scattering color structure 141. For example, the first through third scattering color structures 141, 142, and 143 may be formed on a substrate 110. The first through third scattering color structures 141, 142, and 143 may respectively include flat plate metal layers 120 and color polymer dispersed liquid crystal (PDLC) layers 131, 132, and 133 respectively formed on the flat plate metal layers 120. The color PDLC layers 131, 132, and 133 may respectively display different colors, for example, red, green, and blue colors, or may respectively display yellow, magenta, and cyan colors.

Referring to FIG. 2, the color PDLC layer 131 of the first scattering color structure 141 may include a polymer 12, a plurality of liquid crystal drops 14 dispersed in the polymer 12, and a plurality of color display materials 16R mixed in the liquid crystal drops 14. In FIG. 2, the color display material 16R may display red. The color display material 16R may be a dichroic dye, a quantum dot, or a fluorescent dye. The color PDLC layer 131 may be manufactured by hardening a mixture of a liquid crystal, a polymer, and a dye through ultraviolet (UV) rays or heat, thus causing phase separation into the liquid crystal and the polymer. In example embodiments, refractive indexes of the liquid crystal drop 14 and the polymer 12 may be different, and thus incident white light W may be scattered by the plurality of liquid crystal drops 14.

When the scattered white light W reaches the color display material 16R in the liquid crystal drop 14, only red light R may be reflected, other colors of light may be absorbed, and thus, a red color may be displayed. In a process in which the incident white light W is emitted as the red light R, the light scattered by the liquid crystal drops 14 may be reflected by the flat plate metal layer 120, scattered a plurality of times by the liquid crystal drops 14, and emitted externally. That is, the light reflected by the flat plate metal layer 120 may not be directly emitted to an external location, but emitted to an external location with a uniform distribution in various directions after being scattered by the liquid crystal drops 14. Thus, color formation and uniformly-mixed reflection may be both realized by using the flat plate metal layer 120, which does not introduce a complicated reflection pattern to a reflection layer, and the color PDLC layer 131.

The first scattering color structure 141 shown in FIG. 2 displays red, but example embodiments are not limited thereto. That is, the second scattering color structure 142 and the third scattering color structure 143 include color display materials displaying green and blue, respectively, and thus may realize color formation and a uniformly-mixed reflection.

Figure 3A:
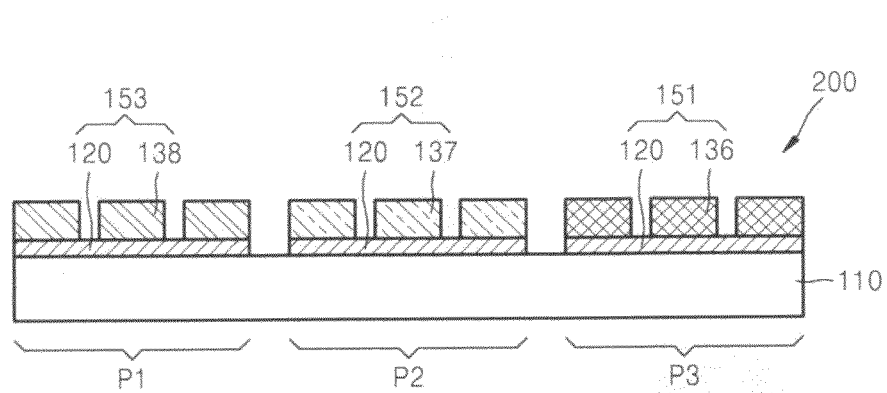
FIGS. 3A and 3B illustrate a schematic cross-sectional view and a plan view of a color filter, respectively, according to example embodiments.
Figure 3B:
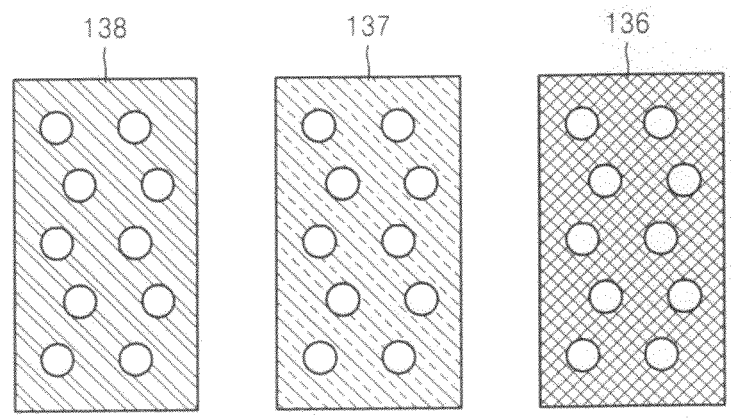

FIGS. 3A and 3B illustrate a schematic cross-sectional view and a plan view of a color filter 200, respectively, according to example embodiments. The color filter 200 may include a pixel unit having a plurality of sub-pixels P1, P2, and P3 of different colors. The plurality of sub-pixels P1, P2, and P3 may include a third scattering color structure 153, a second scattering color structure 152, and a first scattering color structure 151, respectively. The first through third scattering color structures 151, 152, and 153 may include flat plate metal layers 120 and color PDLC layers 136, 137, and 138 formed on the flat plate metal layers 120, respectively. The color PDLC layers 136, 137, and 138 may display red, green, and blue colors, or yellow, magenta, and cyan colors, respectively. The example embodiments described with reference to FIGS. 1 and 2 are different in that a plurality of holes are formed in each of the color PDLC layers 136, 137, and 138 of FIGS. 3A and 3B.

The materials for forming the color PDLC layers 136, 137, and 138 may be substantially the same as those for forming the color PDLC layers 131, 132, and 133 of FIGS. 1 and 2. The proportion of a sum of cross-sectional areas of the plurality of holes in the color PDLC layers 136, 137, and 138 with respect to a sum of cross-sectional areas of the color PDLC layers 136, 137, and 138 may be in the range of about 10 to about 50%. The shape of a hole may not be limited to that illustrated in FIG. 3B, and thus may be a circular shape, an oval shape, a triangular shape, a quadrilateral shape, a pentagonal shape and/or a hexagonal shape. The above-patterns, e.g., the holes, may be formed in the color PDLC layers 136, 137, and 138 considering convenience when employing the color PDLC layers 136, 137, and 138 in a display device, which will be described in detail below.

Figure 4:
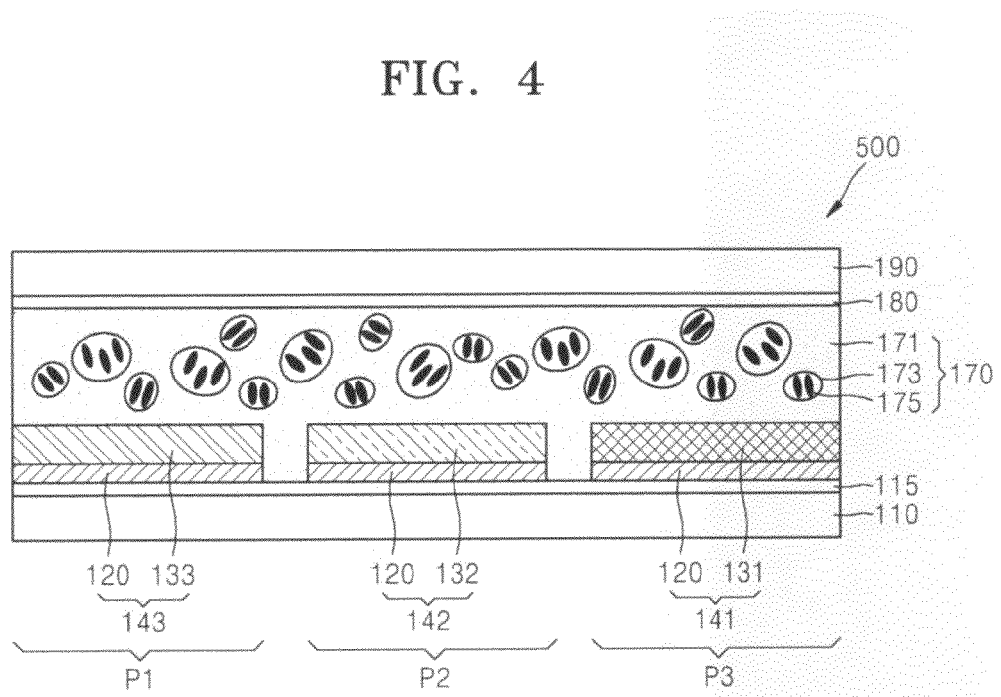
FIG. 4 is a schematic cross-sectional view illustrating a display device according to example embodiments.

FIG. 4 is a schematic cross-sectional view illustrating a display device 500 according to example embodiments. The display device 500 may include a first substrate 110, a color filter formed on the first substrate 110, an optical shutter layer 170 formed on the color filter, a transparent electrode 180 formed on the optical shutter layer 170, and a second substrate 190 formed on the transparent electrode 180.

The color filter may include a pixel unit having a plurality of sub-pixels P1, P2, and P3. The plurality of sub-pixels P1, P2, and P3 may include flat plate metal layers 120 and color PDLC layers 133, 132, and 131 formed on the flat plate metal layers 120, respectively. Materials for forming the color PDLC layers 131, 132, and 133 are the same as those described in FIG. 2.

In the optical shutter layer 170, transmittance of incident light may be individually controlled in a region corresponding to each of the sub-pixels P1, P2, and P3. The optical shutter layer 170 may be formed of a material of which transmittance of incident light varies under electrical control. The optical shutter layer 170 may be formed of a polymer dispersed liquid crystal including a black dye. That is, the optical shutter layer 170 may include a polymer 171, a plurality of liquid crystal drops 173 dispersed in the polymer 171, and a plurality of black dyes 175 mixed in the liquid crystal drops 173. Alternatively, the optical shutter layer 170 may be formed of a general liquid crystal, a cholesteric liquid crystal, an electrowetting material, an electrochromic material and/or an electrophoresis material.

A voltage may be applied between the flat plate metal layer 120 included in each of the plurality of sub-pixels P1, P2, and P3 and the transparent electrode 180, and thus may be used as a pixel electrode for forming an electric field in a region of the optical shutter layer 170, which corresponds to the each of the sub-pixels P1, P2, and P3.

A thin film transistor (TFT) array layer 115 may be formed on the first substrate 110, wherein the TFT array layer 115 may include a plurality of TFTs (not shown) for driving a pixel electrode of each of the plurality of sub-pixels P1, P2, and P3.

An image forming process of the display device 500 will be described. Regions of the sub-pixels P1, P2, and P3 may be controlled when an electric field is applied or not applied according to image information. Thus, the liquid crystal drops 173 of the optical shutter layer 170 may be aligned in one direction or face in random directions. In FIG. 4, the liquid crystal drops 173 face in random directions as an example. When the liquid crystal drops 173 are aligned in one direction, refractive indexes of the polymer 171 and the liquid crystal drop 173 may become equal and the optical shutter layer 170 may become transparent.

When the liquid crystal drops 173 face in random directions, the refractive indexes of the polymer 171 and the liquid crystal drops 173 may become different, and thus light may be scattered in the liquid crystal drops 173. Because the scattered light is absorbed by the black dye 175, the corresponding pixel may become opaque. Light passing through the sub-pixel controlled in a transparent state may enter first through third scattering color structures 141, 142, and 143, which respectively include the flat plate metal layers 120 and the color PDLC layers 133, 132, and 131, and may be emitted as a uniformly-mixed color light.

Figure 5:
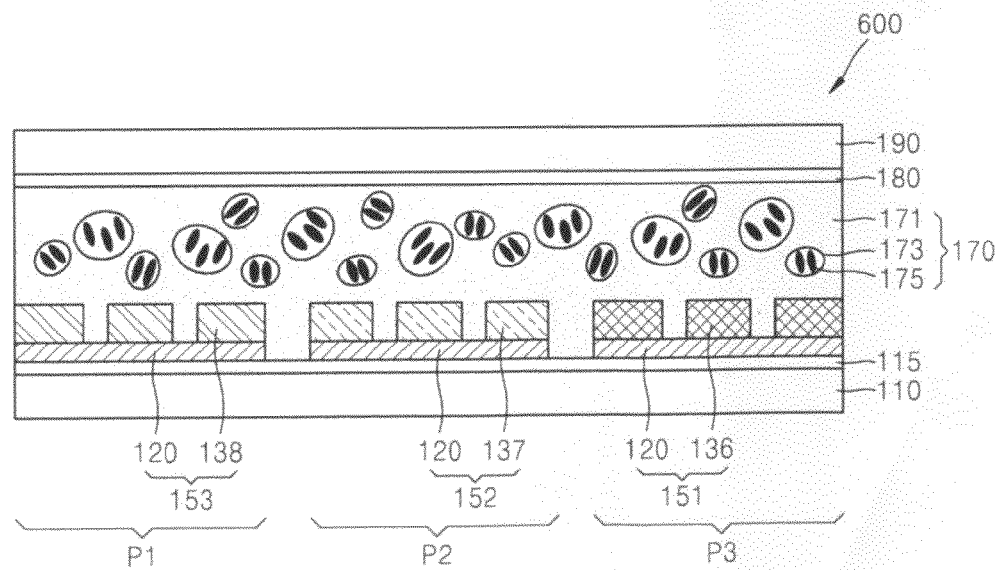
FIG. 5 is a schematic cross-sectional view illustrating a display device according to example embodiments.

FIG. 5 is a schematic cross-sectional view illustrating a display device 600, according to example embodiments. The display device 600 according to example embodiments is different from the display device 500 of FIG. 4 in that a plurality of holes exposing a flat plate metal layer 120 are formed in each of a plurality of color PDLC layers 136, 137, and 138 of FIG. 5. The plurality of holes may be formed in each of the color PDLC layers 136, 137, and 138, so that an efficiency of the display device 600 may be increased when an electric field is applied to an optical shutter layer 170 by applying a voltage between the flat plate metal layer 120 and the transparent electrode 180. The proportion of a sum of cross-sectional areas of the plurality of holes in the color PDLC layers 136, 137, and 138 with respect to a sum of cross-sectional areas of the color PDLC layers 136, 137, and 138 may be in the range of about 10 to about 50%. The shape of the hole may not be limited to that illustrated in FIG. 5, and thus may be a circular shape, an oval shape, a triangular shape, a quadrilateral shape, a pentagonal shape and/or a hexagonal shape.

Figure 6:
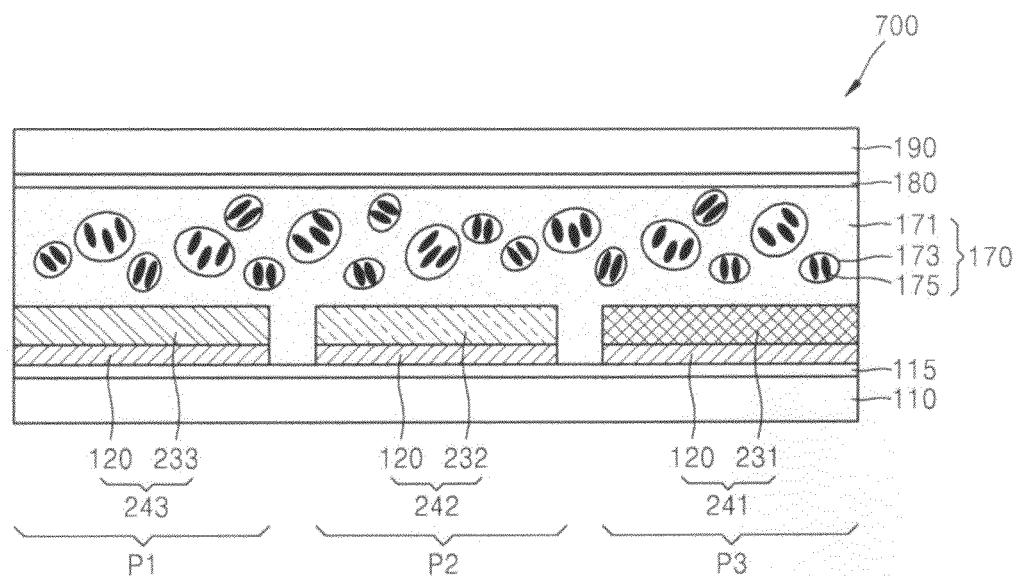
FIG. 6 is a schematic cross-sectional view illustrating a display device, according to example embodiments.
Figure 7:
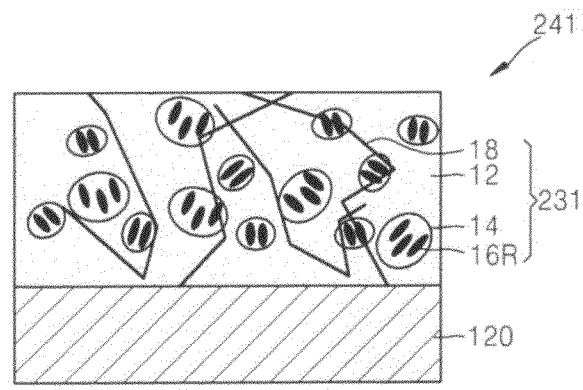
FIG. 7 is a cross-sectional view illustrating a scattering color structure used in a color filter employed in the display device of FIG. 6.

FIG. 6 is a schematic cross-sectional view illustrating a display device 700 according to example embodiments. FIG. 7 is a cross-sectional view illustrating a scattering color structure 241 used in a color filter employed in the display device 700 of FIG. 6. First through third scattering color structures 241, 242, and 243 of FIG. 6 have a different structure from the first through third scattering color structures 141, 142, and 143 of FIG. 4. In detail, color PDLC layers 231, 232, and 233 may further include conductive nano structures 18.

Referring to FIG. 7, the color PDLC layer 231 may include a polymer 12, a plurality of liquid crystal drops 14, and the conductive nano structures 18 that are dispersed in the polymer 12, and a plurality of color display materials 16R mixed in the liquid crystal drops 14.

The conductive nano structure 18 may be provided to apply conductivity to the color PDLC layers 231, 232, and 233. That is, an electric field may be formed in an optical shutter layer 170 by applying a voltage between a transparent electrode 180 and a flat plate metal layer 120, and thus when the color PDLC layers 231, 232, and 233 have conductivities, an efficiency of formation of an electric field may be increased.

The conductive nano structure 18 may be formed of a semiconductor oxide nanowire, e.g., carbon nanotube, ZnO nanowire, $TiO_2$ nanowire, SnO nanowire and/or metal nanowire.

The above-described color filter has a structure having diffuse and reflection functions, and thus displays colors by using the functions. A reflective display device employing the color filter does not introduce an additional diffuse and reflection pattern, thereby providing a display device having a simpler structure and capable of displaying a higher quality image.

It should be understood that example embodiments described therein should be considered in a descriptive sense only and not for purposes of limitation. Descriptions of features or aspects within each example embodiment should typically be considered as available for other similar features or aspects in other example embodiments.

What is claimed is:

1. A display device comprising:
    a first substrate;
    a color filter on the first substrate, the color filter including a pixel unit having a plurality of sub-pixels of different colors, the plurality of sub-pixels each including flat plate metal layers and a plurality of color PDLC layers on the flat plate metal layers, and the plurality of color PDLC layers each include a polymer, a plurality of liquid crystal drops dispersed in the polymer, a plurality of color display materials mixed in the liquid crystal drops and a plurality of holes in each of the plurality of color PDLC layers;
    an optical shutter layer on the color filter and in which transmittance of incident light is individually controlled in a region corresponding to each of the sub-pixels;
    a transparent electrode on the optical shutter layer; and
    a second substrate on the transparent electrode,
    wherein light scattered by the plurality of liquid crystal drops is reflected by the flat plate metal layers,
    wherein the plurality of holes expose the flat plate metal layers with respect to the optical shutter layer, and
    wherein the flat plate metal layers included in each of the plurality of sub-pixels are used as a pixel electrode and voltage applied between the flat plate metal layers and the transparent electrode forms an electric field in a region of the optical shutter layer corresponding to each of the plurality of sub-pixels.

2. The display device of claim 1, wherein the optical shutter layer includes a polymer dispersed liquid crystal mixed with black dyes.

3. The display device of claim 1, further comprising:
    a thin film transistor (TFT) array layer between the first substrate and the color filter, the TFT array layer including a plurality of TFTs for driving the pixel electrode of each of the plurality of sub-pixels.

4. The display device of claim 1, wherein the plurality of sub-pixels display red, green, and blue colors, respectively.

5. The display device of claim 1, wherein the plurality of sub-pixels display yellow, magenta, and cyan colors, respectively.

6. The display device of claim 1, wherein the plurality of color display materials include a dichroic dye, a quantum dot, or a fluorescent dye.

7. The display device of claim 1, wherein the proportion of a sum of cross-sectional areas of the plurality of holes in the plurality of color PDLC layers with respect to a sum of cross-sectional areas of the plurality of color PDLC layers is in the range of about 10 to about 50%.

8. The display device of claim 1, wherein the plurality of color PDLC layers further include conductive nano structures.

9. The display device of claim 8, wherein the conductive nano structures include any one selected from the group consisting of carbon nanotube, ZnO nanowire, $TiO_2$ nanowire, SnO nanowire, and metal nanowire.

* * * * *